United States Patent
Ueno et al.

(10) Patent No.: US 8,195,041 B2
(45) Date of Patent: Jun. 5, 2012

(54) EXPOSURE CONTROL UNIT AND IMAGING APPARATUS

(75) Inventors: Hirotaka Ueno, Saitama (JP); Kazuhiro Matsumoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 12/819,524

(22) Filed: Jun. 21, 2010

(65) Prior Publication Data

US 2010/0322614 A1 Dec. 23, 2010

(30) Foreign Application Priority Data

Jun. 23, 2009 (JP) ................................. 2009-149010

(51) Int. Cl.
*G03B 3/10* (2006.01)

(52) U.S. Cl. ....................................... 396/123; 348/364

(58) Field of Classification Search .................. 396/234, 396/123; 348/364
See application file for complete search history.

(56) References Cited

U.S. PATENT DOCUMENTS

| | | | |
|---|---|---|---|
| 4,786,935 A * | 11/1988 | Hayakawa et al. | ............ 396/234 |
| 5,526,088 A * | 6/1996 | Kusaka | ............................ 396/96 |
| 6,750,994 B1 | 6/2004 | Yamamoto | |
| 6,798,456 B1 | 9/2004 | Sato | |
| 6,839,087 B1 | 1/2005 | Sato | |
| 6,886,154 B2 | 4/2005 | Okuyama | |
| 2004/0190890 A1 | 9/2004 | Osawa | |
| 2006/0158546 A1 | 7/2006 | Hirai | |
| 2006/0164524 A1 * | 7/2006 | Shibano et al. | ............... 348/234 |
| 2008/0025635 A1 * | 1/2008 | Han et al. | ....................... 382/274 |
| 2008/0131021 A1 * | 6/2008 | Fukuda | .......................... 382/274 |
| 2009/0309993 A1 | 12/2009 | Hirai | |
| 2011/0085732 A1 * | 4/2011 | Cheng | ........................... 382/182 |

FOREIGN PATENT DOCUMENTS

JP 2004-109605 4/2004

* cited by examiner

*Primary Examiner* — Rodney Fuller
*Assistant Examiner* — Fang-Chi Chang
(74) *Attorney, Agent, or Firm* — Greenblum & Bernstein, P.L.C.

(57) ABSTRACT

An exposure control unit comprising a photometer, a designator, a first calculator, a first counter, a selector, a second calculator, a categorizer, and an exposure controller is provided. The photometer comprises a plurality of photometric zones. The designator designates the photometric zones one by one as a target zone. The first calculator calculates a first difference. The first counter counts a first determination number. The selector selects the target zone of which the first determination number is greater than a second threshold. The second calculator calculates a categorization value. The categorizer categorizes a target zone into low- or high-luminous zones. The exposure controller controls an exposure of the imaging apparatus on the basis of the partial value of light for one of the low- and high-luminous zones.

7 Claims, 16 Drawing Sheets

EXPOSURE CONTROL UNIT AND IMAGING APPARATUS

BACKGROUND OF THE INVENTION

1. Field of the Invention

The present invention relates to an exposure control unit that controls the exposure of an imaging apparatus, such as a camera.

2. Description of the Related Art

It is known that an exposure of a camera is controlled on the basis of brightness measured by a photometer. It is preferable to control the exposure so that a desired subject is clearly photographed. For the purpose of such an exposure control, the photometer needs to detect a quantity of light from the desired subject.

On taking a photograph, generally not only the desired subject but often other items or scenes are also included in an area to be photographed. Accordingly, dividing the area to be photographed into photometric zones, detecting the quantities of light in each individual photometric zone, and using the quantity of light from one of the nine photometric zones to control the exposure is recommended for photographing with adequate brightness.

In addition, it is known that the desired subject is automatically estimated on the basis of the detected quantities of light in the divided areas, and that the exposure is controlled with respect to the estimated subject. For example, Japanese Unexamined Patent Publication No. 2004-109605 discloses various exposure controls with respect to a subject under a rear-lighting condition.

However, a photometer has been used in a prior art for a divided area that has a scene with a large quantity of light and a subject with a small quantity of light. In this situation it is difficult to accurately detect the quantity of light of the desired subject. As a result, it is difficult to control the exposure accurately.

SUMMARY OF THE INVENTION

Therefore, an object of the present invention is to provide an exposure control unit that accurately estimates a quantity of light for a desired subject and appropriately controls an exposure.

According to the present invention, an exposure control unit of an imaging apparatus comprising a photometer, a designator, a first calculator, a first counter, a selector, a second calculator, a categorizer, and an exposure controller, is provided. The photometer comprises a plurality of photometric zones on a light-receiving surface. An optical image of an object to be imaged by the imaging apparatus is made incident on the light-receiving surface of the photometer. Each of the photometric zones detects a partial quantity of light incident on each photometric zone. The designator designates a plurality of the photometric zones one by one as a target zone. The designator designates a plurality of the photometric zones arranged in predetermined positions with respect to the target zone as neighboring zones. The first calculator calculates a first difference between light values. The first difference of light values is a difference between a partial value of light in the target zone and the partial value of light in the neighboring zones. The partial value of light varies according to the partial quantity of light. The first counter counts a first determination number for each target zone. The first determination number is the number of neighboring zones with the first difference of light values that is less than a first threshold for the temporarily designated target zone. The selector selects the target zone of which the first determination number is greater than a second threshold. The second calculator calculates a categorization value on the basis of the partial value of light of the target zone selected by the selector. The categorization value us used for categorization of the target zone. The categorizer categorizes a target zone having the partial value of light that is less than the categorization value into a low-luminous zone among the target zones selected by the selector. The categorizer categorizes a target zone having the partial value of light that is greater than the categorization value into a high-luminous zone among the target zones selected by the selector. The exposure controller controls an exposure of the imaging apparatus on the basis of the partial value of light of at least one of the low- and high-luminous zones.

According to the present invention, an imaging apparatus comprising a photometer, a designator, a first calculator, a selector, a second calculator, a categorizer, and an exposure controller, is provided. The photometer comprises a plurality of photometric zones on a light-receiving surface. An optical image of an object to be imaged is incident on the light receiving surface of the photometer. Each of the photometric zones detects a partial quantity of light incident on each individual photometric zone. The designator designates a plurality of the photometric zones one by one as a target zone. The designator designates a plurality of the photometric zones arranged in predetermined positions with respect to the target zone as neighboring zones. The first calculator calculates a first difference between light values. The first difference of light values is a difference between a partial value of light in the target zone and the partial value of light in the neighboring zones. The partial value of light varies according to the partial quantity of light. The selector selects the target zone of which a first determination number is greater than a second threshold. The first determination number is the number of the neighboring zones with the first difference of light values that is less than a first threshold for the tentatively designated target zone. The second calculator calculates a categorization value on the basis of the partial value of light of the target zone selected by the selector. The categorization value is used for categorization of the target zone. The categorizer categorizes a target zone having the partial value of light that is less than the categorization value into a low-luminous zone among the target zones selected by the selector. The categorizer categorizes a target zone having the partial value of light that is greater than the categorization value into a high-luminous zone among the target zones selected by the selector. The exposure controller controls an exposure of the imaging apparatus on the basis of the partial value of light of at least one of the low- and high-luminous zones.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
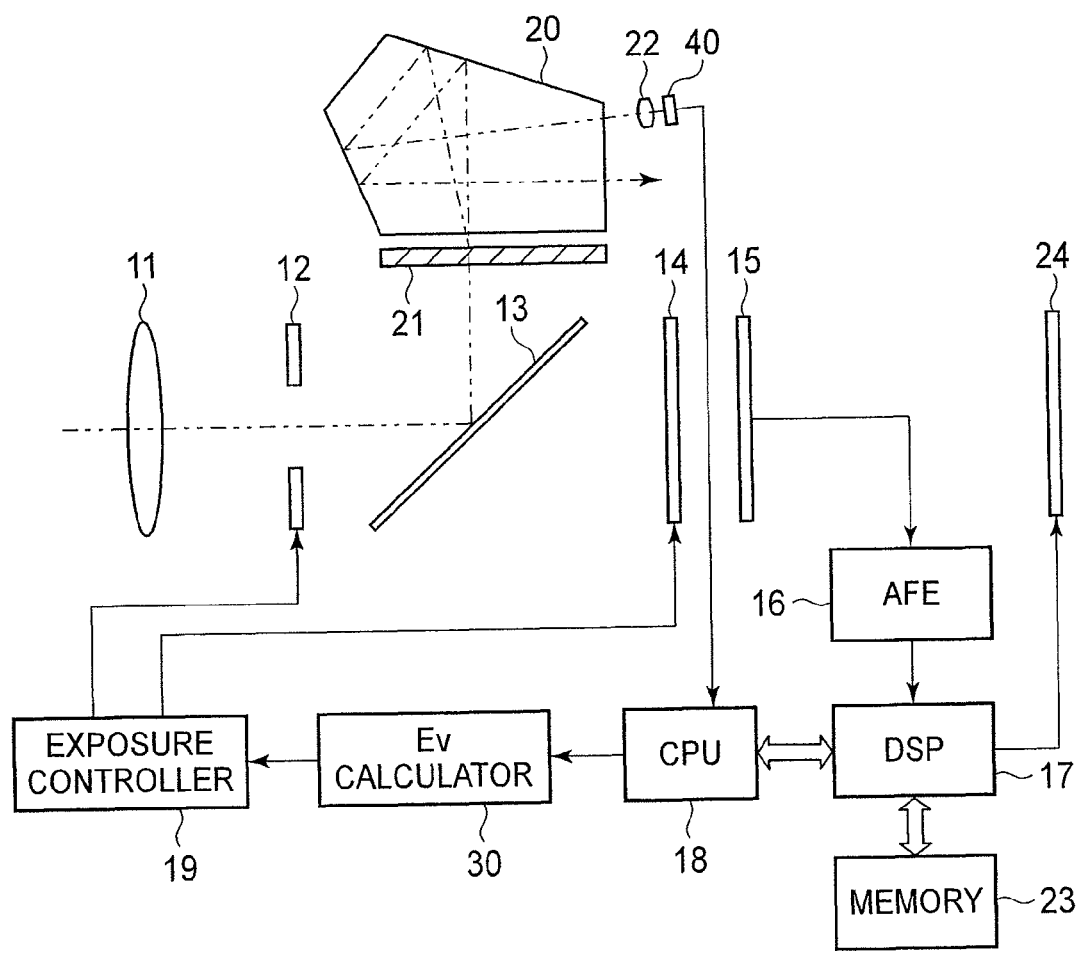
FIG. 1 is a block diagram showing the internal structure of a single-lens reflex camera having the exposure control unit of the embodiment of the present invention.

The present invention is described below with reference to the embodiment shown in the drawings.

In FIG. 1, the single-lens reflex camera 10 comprises a photographic optical system 11, a diaphragm 12, a main mirror 13, a shutter 14, an image sensor 15, an AFE 16, a digital signal processor (DSP) 17, a CPU 18, an Ev calculator 30, an exposure controller 19, and other components.

The photographic optical system 11 comprises a plurality of lenses, including a focus lens (not depicted) and a zoom lens (not depicted). The image sensor 15 is arranged on the optical axis of the photographic optical system 11 so that the light-receiving surface of the imaging device 30 is perpendicular to the optical axis. The photographic optical system 11 enables an optical image of a subject to be in focus on the light-receiving surface.

The diaphragm 12, the main mirror 13, and the shutter 14 are arranged between the photographic optical system 11 and the imaging device 30.

The diaphragm 12 has an aperture that is adjustable. By varying the size of the aperture of the diaphragm 12, the quantity of light incident on the image sensor 15 can be adjusted. The aperture ratio of the diaphragm 12 is controlled by the exposure controller 29.

An optical image passing through the photographic optical system 11 reaches either a viewfinder (not depicted) or the shutter 14 according to the position of the main mirror 13. In ready mode for photographing, the main mirror 13 is kept in position on the optical axis, and an optical image is reflected by the main mirror 13 to a pentaprism 29 and transmitted to the viewfinder. In a release operation, the main mirror 13 is turned upward so that the optical image can reach the shutter 14. A mirror driving mechanism (not depicted) changes the position of the main mirror 14.

The optical image is reflected toward a focusing screen 21 by the main mirror 14 in ready mode for photographing, and the optical image formed on the focusing screen is in focus. The optical image passes through the focusing screen 21 and is brought into focus by a photometric lens 22 on a photometer 40. As described in detail later, the photometer 40 detects the quantity of light of the optical image, and the detected light quantity is used in the control of an exposure.

By opening and closing the shutter 14, light arriving at the imaging device 30 may be controlled. In the ready mode for photographing, the shutter 14 is closed and the optical image does not reach the image sensor 15. On the other hand, the shutter 14 is opened during an opening period in the release operation so that the optical image can reach the image sensor 15. By changing the shutter speed, an exposure time for the image sensor 15 can be adjusted. The exposure controller 19 controls the shutter speed.

The CPU 18 controls the exposure controller to drive the diaphragm 12 and the shutter 14. In addition, the CPU 18 controls the mirror driving mechanism to open and close the main mirror 13. Furthermore, the CPU 18 controls the operations for each of the components of the single-lens reflex camera 10.

When the shutter 14 is opened and the optical image reaches the image sensor 15, the image sensor 15 generates an image signal corresponding to the optical image. The generated image signal undergoes correlated double sampling (CDS) processing and auto gain control (AGC) processing at the AFE 16. In addition, the AFE 16 digitizes the image signal and converts it to image data. The image data are transmitted to the DSP 17.

The DSP 17 carries out predetermined data processing on the received image data. The image data, having undergone predetermined data processing, are stored in a memory 23 or transmitted to an LCD 24, where a captured image is displayed.

The DSP 17 is connected to the CPU 18. The DSP 17 controls operations such as predetermined processing of the image data, storage of the image data, and display of the image corresponding to the image data.

Next, the control of the exposure and the structure of both the photometer 40 and the Ev calculator 30 are explained below.

Figure 2:
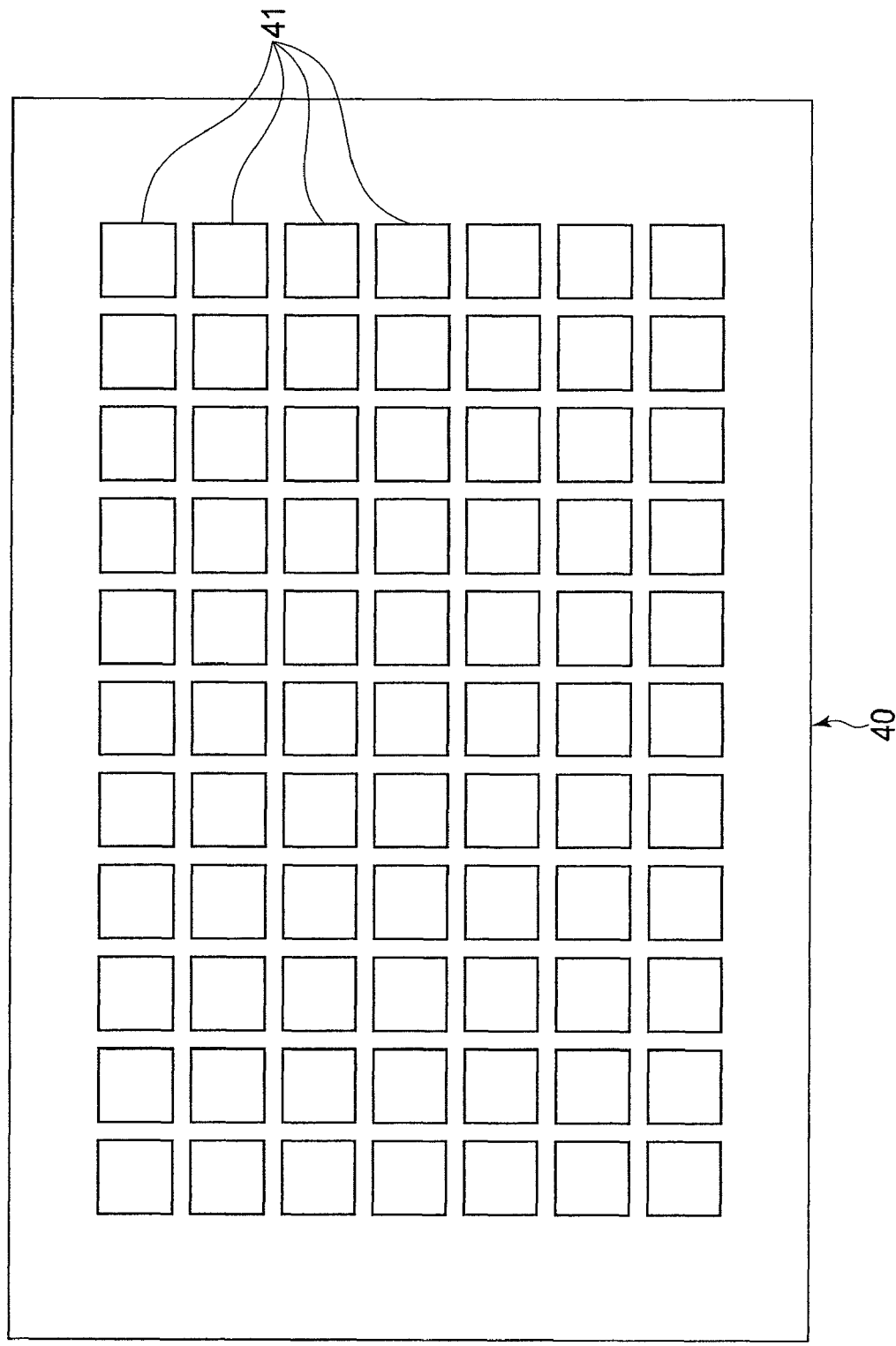
FIG. 2 is a plan view of the light-receiving surface of the photometer.

As shown in FIG. 2, a light-receiving surface of the photometer 40 is divided into seventy-seven photometric zones 41 arranged in seven rows and eleven columns. An optical image of the same area to be photographed by the image sensor 15 is formed on the light-receiving surface of the photometer 40. A photoelectric converter is mounted on the surface of each photometric zone 41. Photometric signals are generated according to the quantity of light incident on each photometric zone 41.

The photometric signals are digitized and converted into photometric data. The photometric data are transmitted to the Ev calculator 30 via the CPU 18. The Ev calculator 30 calculates one usage-exposure value (u-Ev) on the basis of the received photometric data. The calculated u-Ev is transmitted to the exposure controller 19. The exposure controller 19 controls at least one of the aperture ratio of the diaphragm 12 and shutter speed so that they are appropriate for the u-Ev.

In the single-lens reflex camera 10, the u-Ev can be calculated according to any method among center-weighted metering, spot metering and multi-zone metering. One of the above methods is selected by a user's input to a selection dial (not depicted). The Ev calculator 30 calculates the u-Ev on the basis of the photometric data according to the selected method.

Figure 3:
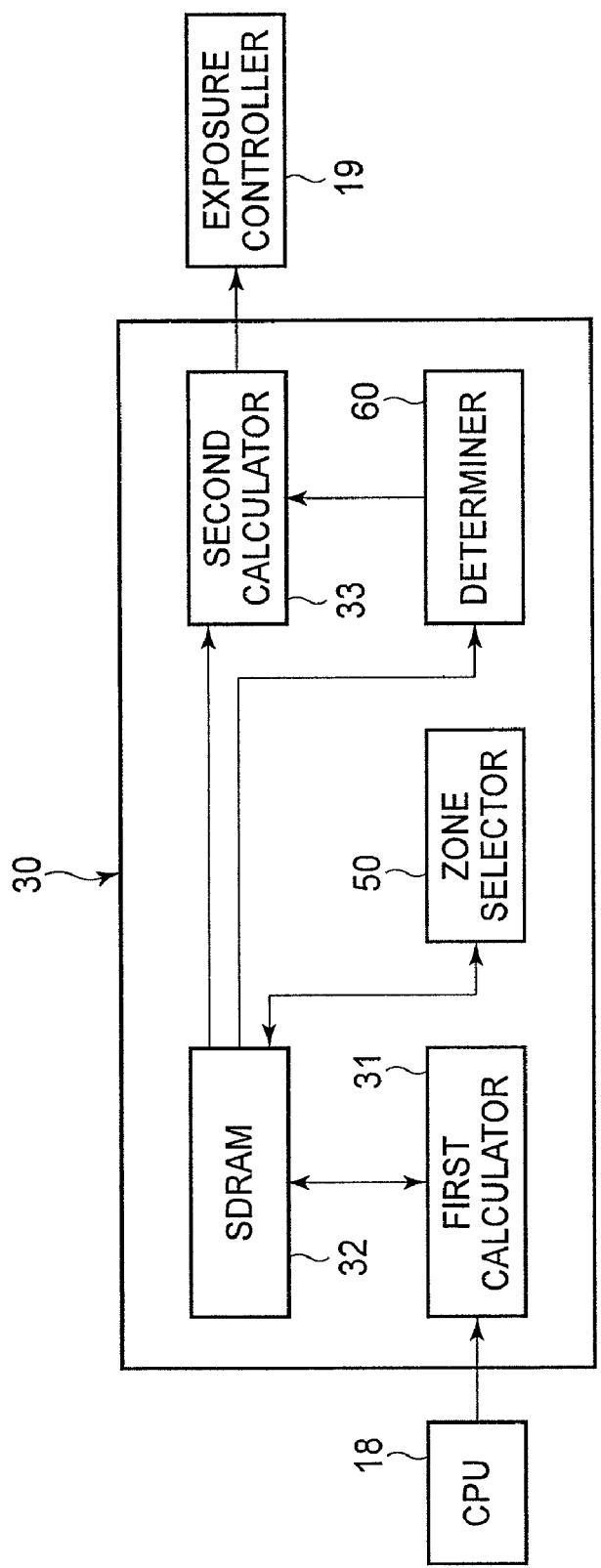
FIG. 3 is a block diagram showing the internal structure of the Ev calculator.

As shown in FIG. 3, the Ev calculator 30 comprises a first calculator 31, a zone selector 50, an SDRAM 32, a determiner 60, and a second calculator 33.

The photometric data transmitted from the CPU 18 are input to the first calculator 31. The first calculator 31 calculates an exposure value for each photometric zone 41, hereinafter referred to as a partial Ev, on the basis of the received photometric data. A partial Ev is an exposure value based on the quantity of light incident on a single photometric zone 41 that corresponds to the photometric data used in the calculation of the partial Ev. The calculated partial Ev is stored in the SDRAM 32 as partial Ev data.

The SDRAM 32 has storage areas to separately store the partial EV data for the photometric zones 41. The first calculator 31 stores the partial Ev data in separate storage areas that are determined with respect to each photometric zone 41.

When either center-weighted metering or spot metering are selected, the second calculator 33 reads the partial Ev data for a particular photometric zone 41, which is determined according to either center-weighted metering or spot metering, from the SDRAM 32. The second calculator 33 calculates the u-Ev on the basis of the read-out partial Ev data and the appropriate equation for either center-weighted metering or spot metering. As described above, the calculated u-Ev is transmitted to the exposure controller 19.

When multi-zone metering is selected, the zone selector 50 and the determiner 60 carry out predetermined functions as described below after the first calculator 31 stores the partial Ev data for all the photometric zones 41 in the SDRAM 32. The predetermined functions carried out by the zone selector 50 and the determiner 60, and the structures of the zone selector 50 and the determiner 60 are explained below.

Figure 4:
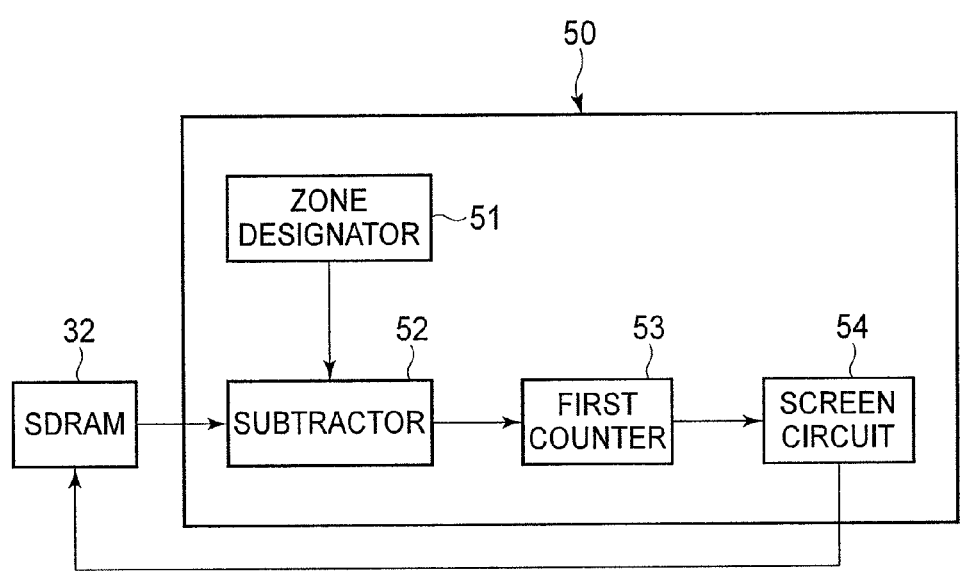
FIG. 4 is a block diagram showing the internal structure of the zone selector.

As shown in FIG. 4, the zone selector 50 comprises a zone designator 51, a subtractor 52, a first counter 53, and a screening circuit 54.

The zone designator 51 designates a photometric zone 41 as a target zone among forty-five photometric zones 41 arranged in five rows and nine columns, but excluding the top and bottom rows and the left- and right-most columns from all of the photometric areas on the photometer 40.

Figure 5:
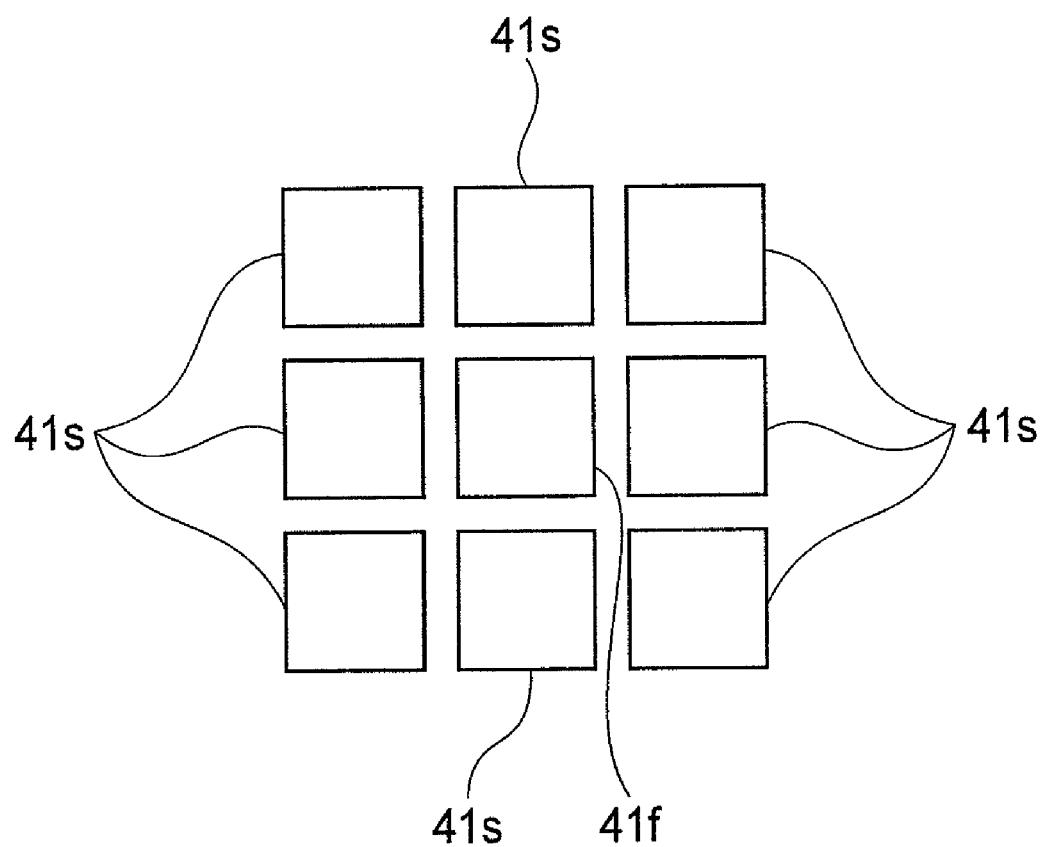
FIG. 5 is a deployment diagram showing the positions of the neighboring zones adjacent to the target zone.

In addition, as shown in FIG. 5, the zone designator 51 designates eight photometric zones 41, which surround the target zone 41a, as neighboring zones 41s. The zone designator 51 designates a photometric zone 41 other than the previously designated target zone 41f as a target zone 41f after the screen circuit 54 finishes the determination as described below using the previously designated target zone 41f and neighboring zones 41s. All forty-five photometric zones 41 are designated one by one as the target zone 41f.

The photometric areas 41 designated as the target zone 41f and the neighboring zones 41s are transmitted as data from the zone designator 51 to the subtractor 52. The subtractor 52 reads the partial Ev data corresponding to the photometric areas 41 designated as the target zone 41f and the neighboring zones 41s.

The subtractor 52 calculates differences between the partial Ev corresponding to the photometric zone 41 designated as the target zone 41f and the neighboring zones 41s, hereinafter referred to as the first Ev differences. Since, as described above, eight photometric zones 41 are designated as neighboring zones 41s for a single target zone 41f, eight first Ev differences are calculated for a single target zone 41f. The calculated first Ev differences are transmitted as data to the first counter 53.

The first counter 53 compares the first Ev differences with a first threshold. For example, the first threshold is predetermined to be 0.5 Ev. On the basis of the comparison, the first counter 53 counts a first determination number, which is the number of the eight first Ev differences that are less than or equal to the first threshold (0.5 Ev). The first determination number is transmitted as data to the screen circuit 54.

The screen circuit 54 determines whether or not the first determination number is greater than a second threshold. For example, the second threshold is determined to be 3. When the first determination number is greater than the second threshold, the screen circuit 54 selects the target zone 41f as a photometric zone 41 for usage in the later determination. On the other hand, when the first determination number is less than or equal to the second threshold the screen circuit 54 screens out the present target zone 41f. Usage data, which indicates that the photometric zone 41 has been selected by the screen circuit 54, is added to the partial Ev data corresponding to the photometric zone 41 selected as a photometric zone 41 for usage in the later determination.

After the screen circuit 54 finishes the determination process for all of the photometric zones 41 designated one by one as the target zone 41f, the determiner 60 starts to determine the u-Ev.

Figure 6:
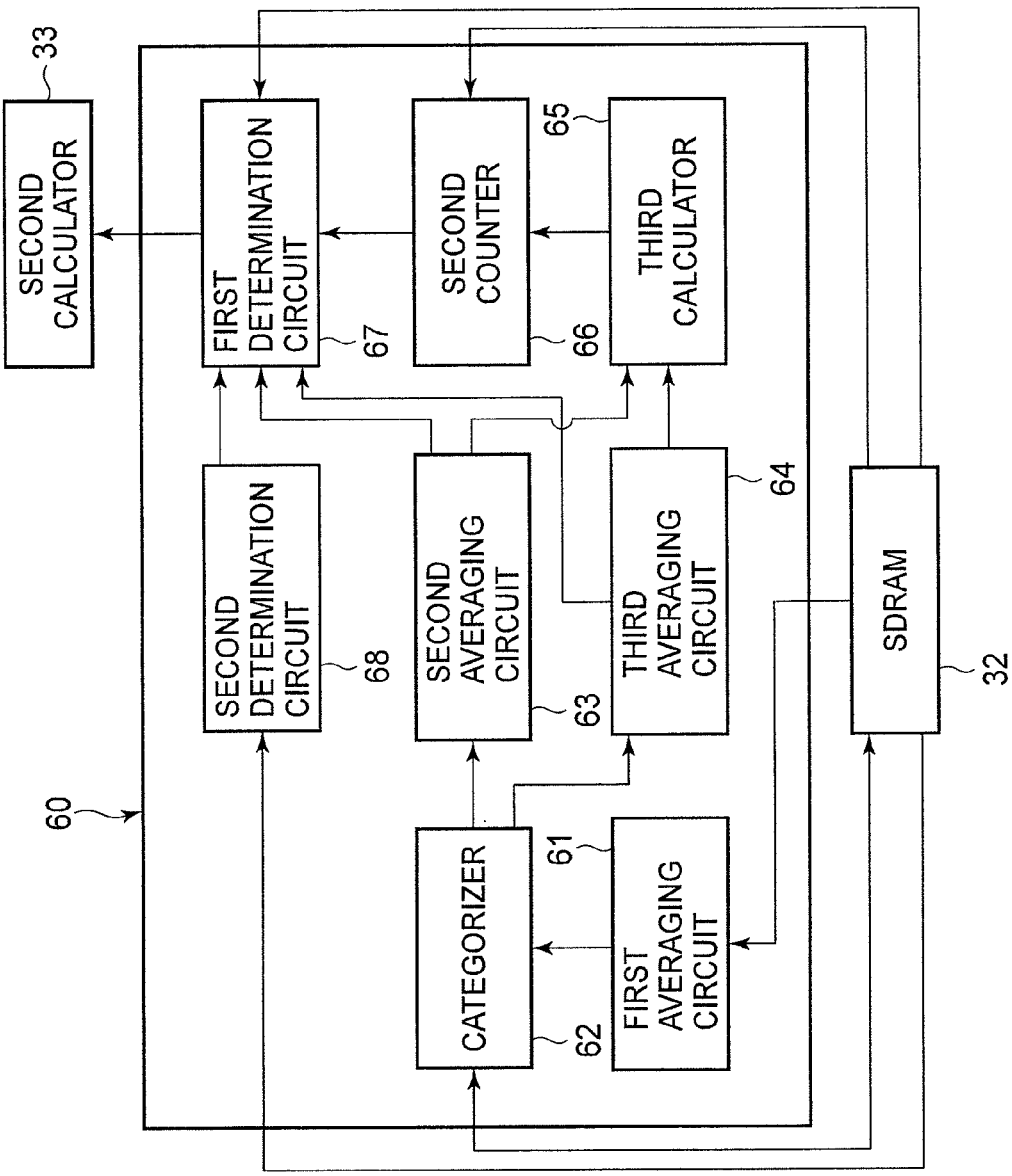
FIG. 6 is a block diagram showing the internal structure of the determiner.

As shown in FIG. 6, the determiner 60 comprises a first averaging circuit 61, a categorizer 62, a second averaging circuit 63, a third averaging circuit 64, a third calculator 65, a second counter 66, a first determination circuit 67, and a second determination circuit 68.

After the screen circuit 54 finishes the determination as described above, the first averaging circuit 61 reads from the SDRAM 32 all of the partial Ev data that the usage data have been added to. The first averaging circuit 61 calculates a first average value, which is an average of the partial Evs corresponding to the read-out partial Ev data. The calculated first average value is transmitted as data to the categorizer 62.

On receiving the first average value data, the categorizer 62 reads from the SDRAM 32 all of the partial Ev data, one by one, that the usage data were added to. The categorizer compares each of the partial Evs with the first average value.

When partial Ev is greater than the first average value, the categorizer 62 designates the photometric zone corresponding to that specific partial Ev as a high-luminous zone and transmits the partial Ev data to the second averaging circuit 63. On the other hand, when the partial Ev is less than the first average value, the categorizer 62 designates the photometric zone 41 corresponding to that specific partial Ev as a low-luminous zone and transmits the partial Ev data to the third averaging circuit 64.

After the categorization of all the photometric zones 41 corresponding to all of the partial Ev data that the usage data were added to, the second averaging circuit 63 calculates a high-luminous average value, which is an average of the partial Evs corresponding to all of the partial Ev data received from the categorizer 62. Simultaneously, the third averaging circuit 64 calculates a low-luminous average value, which is an average of the partial Evs corresponding to all of the partial Ev data received from the categorizer 62.

The calculated high- and low-luminous average values are transmitted as data to the third calculator 65. In addition, the high- and low-luminous average value data are transmitted to the first determination circuit 67.

The third calculator 65 calculates a standard value, which is an average of the high- and low-luminous values. The calculated standard value is transmitted as data to the second counter 66.

The second counter 66 designates a predetermined range from the standard value as a determination range. For example, the range of ±1 Ev from the standard value is designated as the determination range. After designation, the second counter 66 reads from the SDRAM 32 all of the partial Ev data that the usage data were added to.

In addition, the second counter 66 counts a second determination number, which is the number of partial Evs found in the designated determination range among all read-out partial Ev data. The second determination number is transmitted as data to the first determination circuit 67.

The first determination circuit 67 counts a third determination number, which is the number of partial Ev data that usage data were added to. After counting the third determination number, the first determination circuit 67 calculates a determination value by dividing the second determination number by the third determination number. And then, the first determination circuit 67 compares the determination value to a third threshold. For example, the third threshold is predetermined to be ¼.

When the determination value is greater than the third threshold, the first determination circuit 67 reads all of the partial Ev data corresponding to each one of the seventy-seven photometric zones 41 because the exposure of the single-lens reflex camera 10 should be controlled on the basis of all of the photometric zones 41. The first determination circuit 67 calculates an average value for all of the partial Evs, and transmits the calculated average value to the second calculator 33 (see FIGS. 3 and 6). The second calculator 33 transmits the received average value as the u-Ev to the exposure controller 19.

On the other hand, when the determination value is less than or equal to the third threshold, the second determination circuit 68 determines whether a subject is under front or rear lighting conditions, as described in detail below. Under the front lighting condition, a subject within the area to be photographed is illuminated by a light source located behind the camera. Under the rear lighting condition, a subject within the area to be photographed is illuminated by a light located in front of the camera. When the subject is determined to be under the front lighting condition, the high-luminous average value data is transmitted to the second calculator 33. On the other hand, when the subject is under the rear lighting condition, the low-luminous average value data is transmitted to the second calculator 33. The second calculator 33 transmits the received high- or low-luminous average value as the u-Ev to the exposure controller 19.

Next, the determination by the second determination circuit 68 is explained below. As described above, when the determination value is less than or equal to the third threshold, the second determination circuit 68 determines whether a subject whose optical image has been captured by the photometer 40 is under front or rear lighting conditions.

Figure 7:
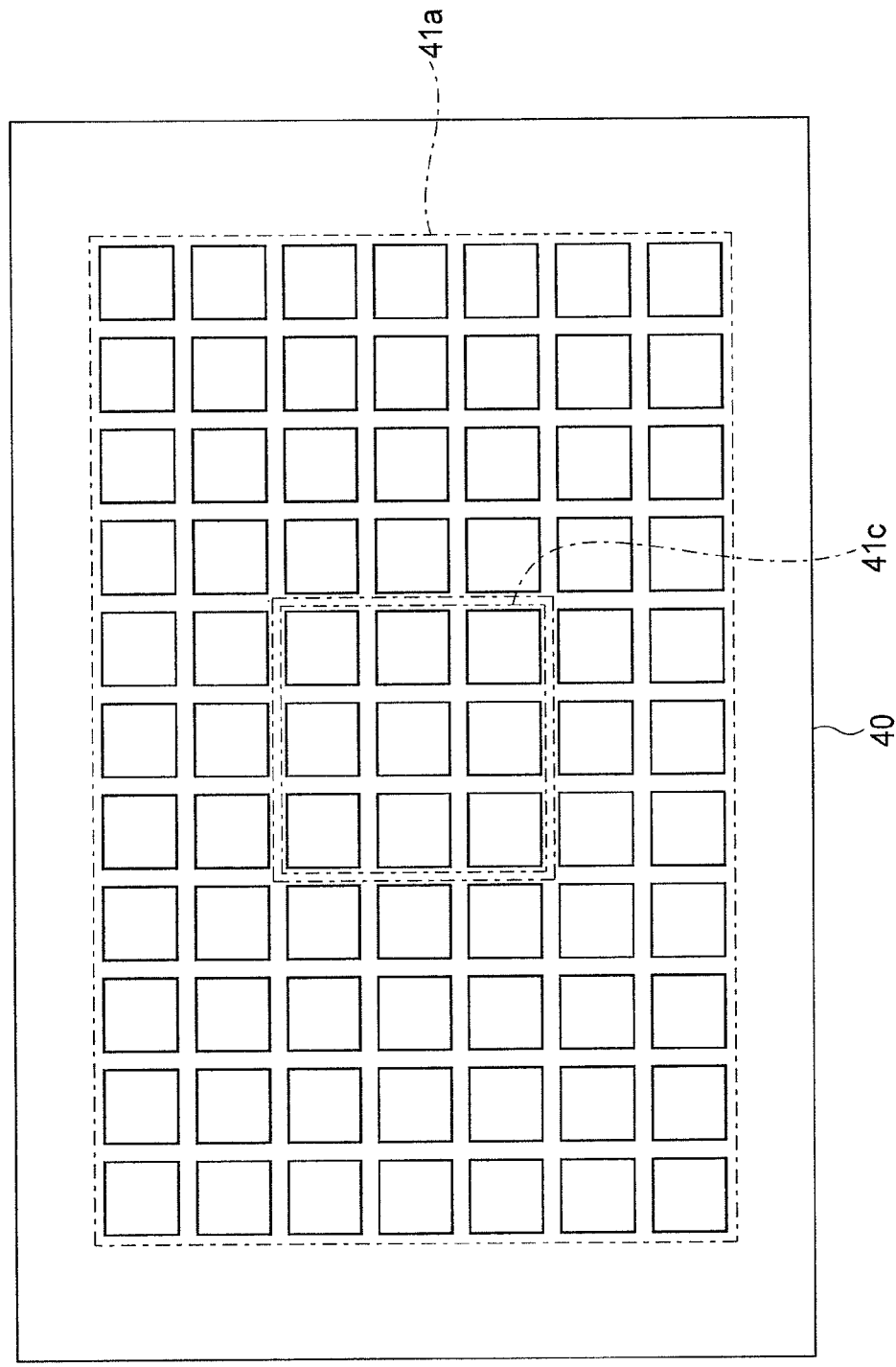
FIG. 7 is a plan view of the light-receiving surface of the photometer, showing the central area and the surrounding area.

For determination of the lighting condition, nine photometric zones 41 arranged in three rows and three columns at the center of the light-receiving surface of the photometer 40 are predetermined to be a central area 41c (see FIG. 7). An area formed by all the photometric zones 41 excluding the photometric zones in the central area is predetermined to be a surrounding area 41a.

The second determination circuit 68 calculates a central exposure value by averaging the partial Evs corresponding to the photometric zones 41 in the central area 41c. In addition, the second determination circuit 68 calculates a surrounding exposure value by averaging the partial Evs corresponding to the photometric zones 41 in the surrounding area 41a.

The second determination circuit 68 calculates a second Ev difference (second difference of light variable) by subtracting the surrounding exposure value from the central exposure value. The second determination circuit 68 compares the calculated second Ev difference to a fourth threshold. For example, the fourth threshold is predetermined to be ±0 Ev. When the second Ev difference is less than and equal to the fourth threshold, a subject is determined to be under the rear lighting condition. On the other hand, when the second Ev difference is greater than the fourth threshold, a subject is determined to be under the front lighting condition. The second determination circuit 68 communicates the determination to the first determination circuit 67. Then, as described above, the first determination circuit 67 transmits the high- or low-luminous average value data to the second calculator 33.

Figure 8:
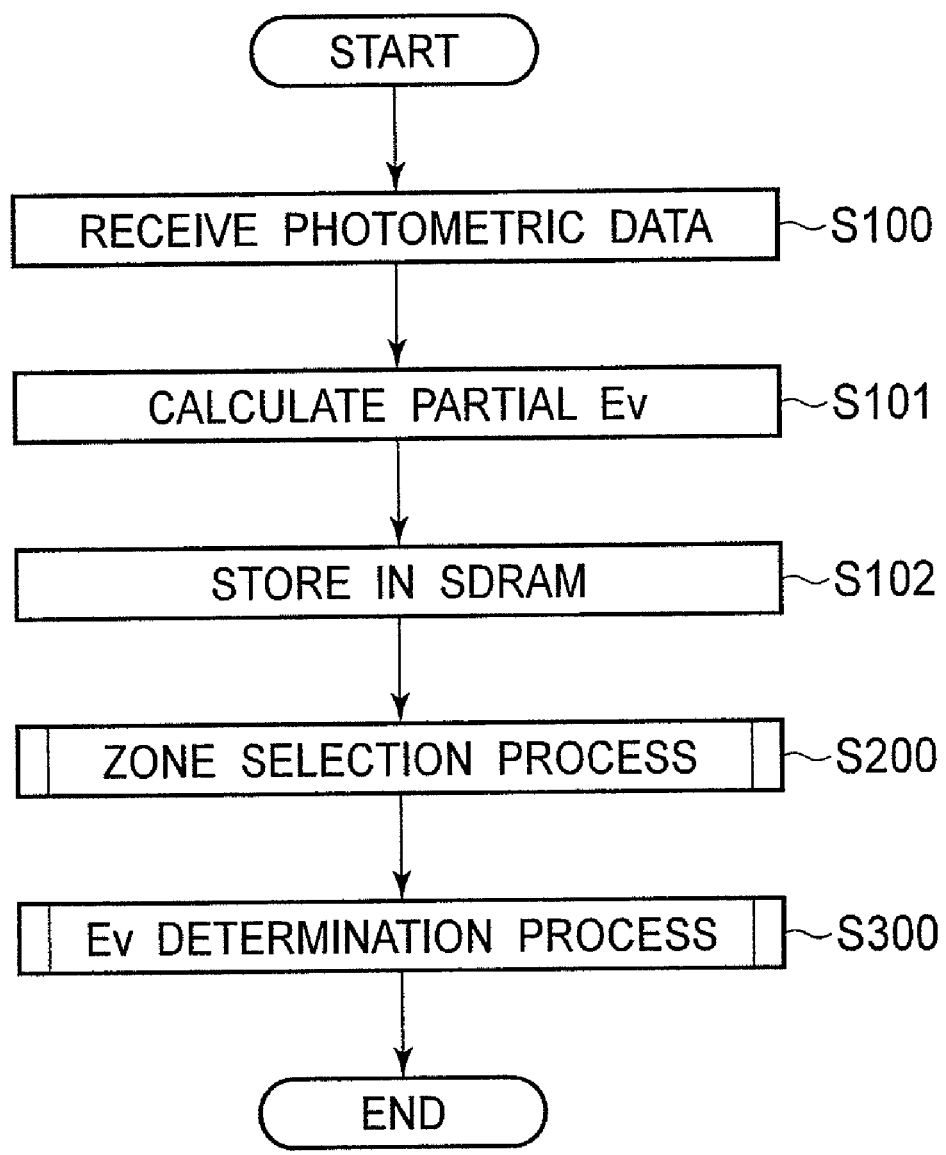
FIG. 8 is a flowchart illustrating the process for the calculation of the u-Ev in the multi-zone metric carried out by the Ev calculator.

Next, the process for the calculation of the u-Ev in the multi-zone metric carried out by the Ev calculator 30 is explained using the flowchart of FIG. 8. The process for the calculation of the u-EV commences when a photometric switch (not depicted) is changed to the on state when the multi-zone metric is selected.

At step S100, the Ev calculator 30 receives the photometric data corresponding to a photometric signal generated by the photometer 40 via the CPU 18. After receiving the photometric data, the process proceeds to step S101.

At step S101, the Ev calculator 30 calculates the partial Ev on the basis of the photometric data for each individual photometric zone 41. After calculating the partial Ev for all the photometric zones 41, the process proceeds to step S102.

At step S102, the Ev calculator 30 stores the partial Ev data corresponding to the calculated Evs in the SDRAM storage areas that have been determined for each photometric zone 41. After storing the partial Ev data, the process proceeds to step S200.

At step S200, the Ev calculator 30 carries out zone selection process as described in detail later. After carrying out zone selection process, the process proceeds to step S300.

At step S300, the Ev calculator 30 carries out Ev determination process as described in detail later. When carrying out Ev determination process, calculation of the u-Ev in the multi-zone metric is terminated.

Figure 9:
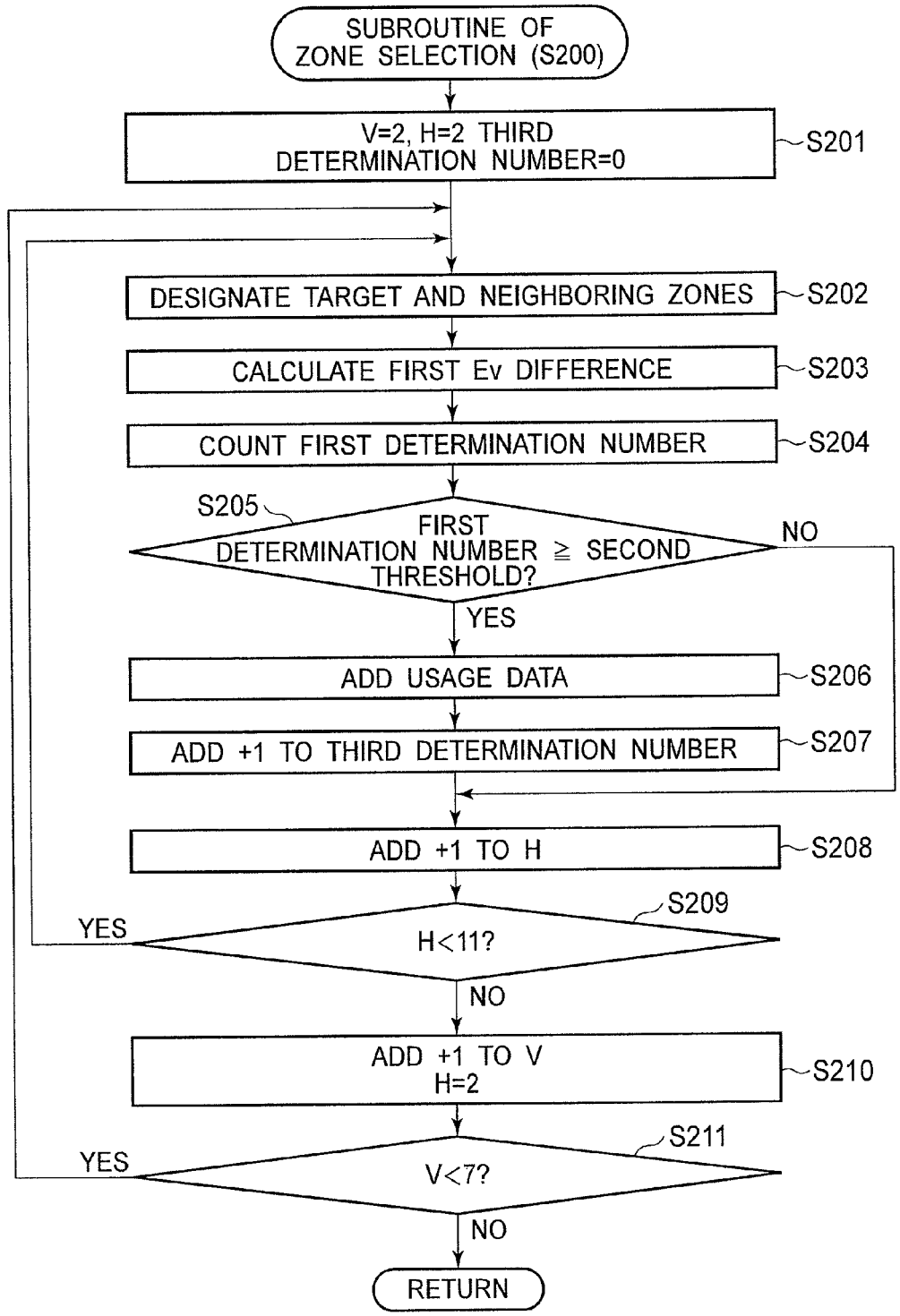
FIG. 9 is a flowchart illustrating the subroutine of the zone selection.

Next, a subroutine of the zone selection process (S200) is explained below using the flowchart of FIG. 9.

At step S201, the Ev calculator 30 resets vertical and horizontal designation numbers (see "V" and "H" in FIG. 9) to 2. In addition, the Ev calculator 30 resets the third determination number to zero. After initialization of the vertical and horizontal designation numbers and the third determination number, the process proceeds to step S202.

At step S202, the Ev calculator 30 designates a photometric zone 41 arranged in the row of the vertical designation number and the column of the horizontal designation number as the target zone 41f. In addition, the Ev calculator 30 designates eight photometric zones 41 surrounding the target zone 41f as the neighboring zone 41s. After the designation of the target zone 41f and the neighboring zone 41s, the process proceeds to step S203.

At step S203, the Ev calculator 30 calculates the first Ev differences, which are the differences between the partial Evs corresponding to the photometric areas 41 designated as the target zone 41f and the neighboring zones 41s. After calculation of the first Ev differences for all the neighboring zones 41s, the process proceeds to step 204.

At step S204, the Ev calculator 30 counts the first determination number, which is the number of first Ev differences less than or equal to the first threshold among the eight first Ev differences. After counting the first determination number, the process proceeds to step S205.

At step S205, the Ev calculator 30 determines whether the first determination number is greater than or equal to the second threshold. When the first determination number is greater than or equal to the second threshold, the process proceeds to step S206. When the first determination number is less than the second threshold, the process skips steps S206 and S207 and proceeds to step S208.

At step S206, the Ev calculator 30 adds the usage data to the partial Ev data corresponding to the target zone 41f. After addition of the usage data, the process proceeds to step S207.

At step S207, the Ev calculator 30 adds +1 to the third determination number. After addition to the third determination number, the process proceeds to step S108.

At step S207, the Ev calculator 30 adds +1 to the third determination number. After addition to the third determination number, the process proceeds to step S208.

At step S209, the Ev calculator 30 determines whether the horizontal designation number is less than eleven. When the horizontal designation number is less than 11, the process returns to step S202 and steps S202 to S209 are repeated until the horizontal designation number is determined to be greater than or equal to eleven. When the horizontal designation number is greater than or equal to eleven, the process proceeds to step S210.

At step S210, the Ev calculator 30 adds +1 to the vertical designation number and resets the horizontal designation number to two. After addition to the vertical designation number and reset of the horizontal designation number, the process proceeds to step S211.

At step S211, the Ev calculator 30 determines whether the vertical designation number is less than seven. When the vertical designation number is less than seven, the process returns to step S202 and steps S202 to S211 are repeated until the vertical designation number is designated to be greater than or equal to seven. When the vertical designation number is greater than or equal to seven, a subroutine of the zone selection process terminates and the process proceeds to step S300.

Figure 10:
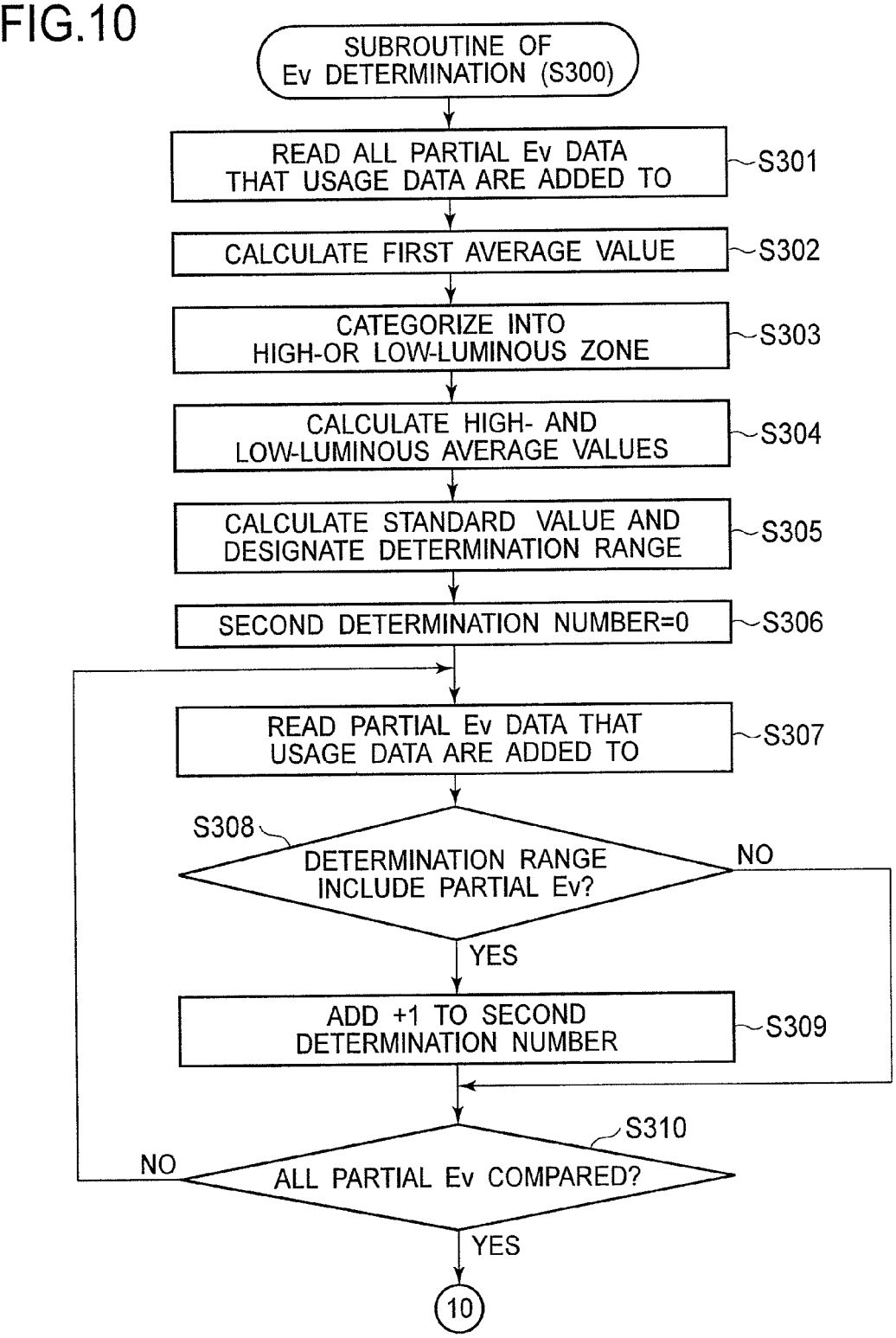
FIG. 10 is a first flowchart illustrating the subroutine of the Ev determination.
Figure 11:
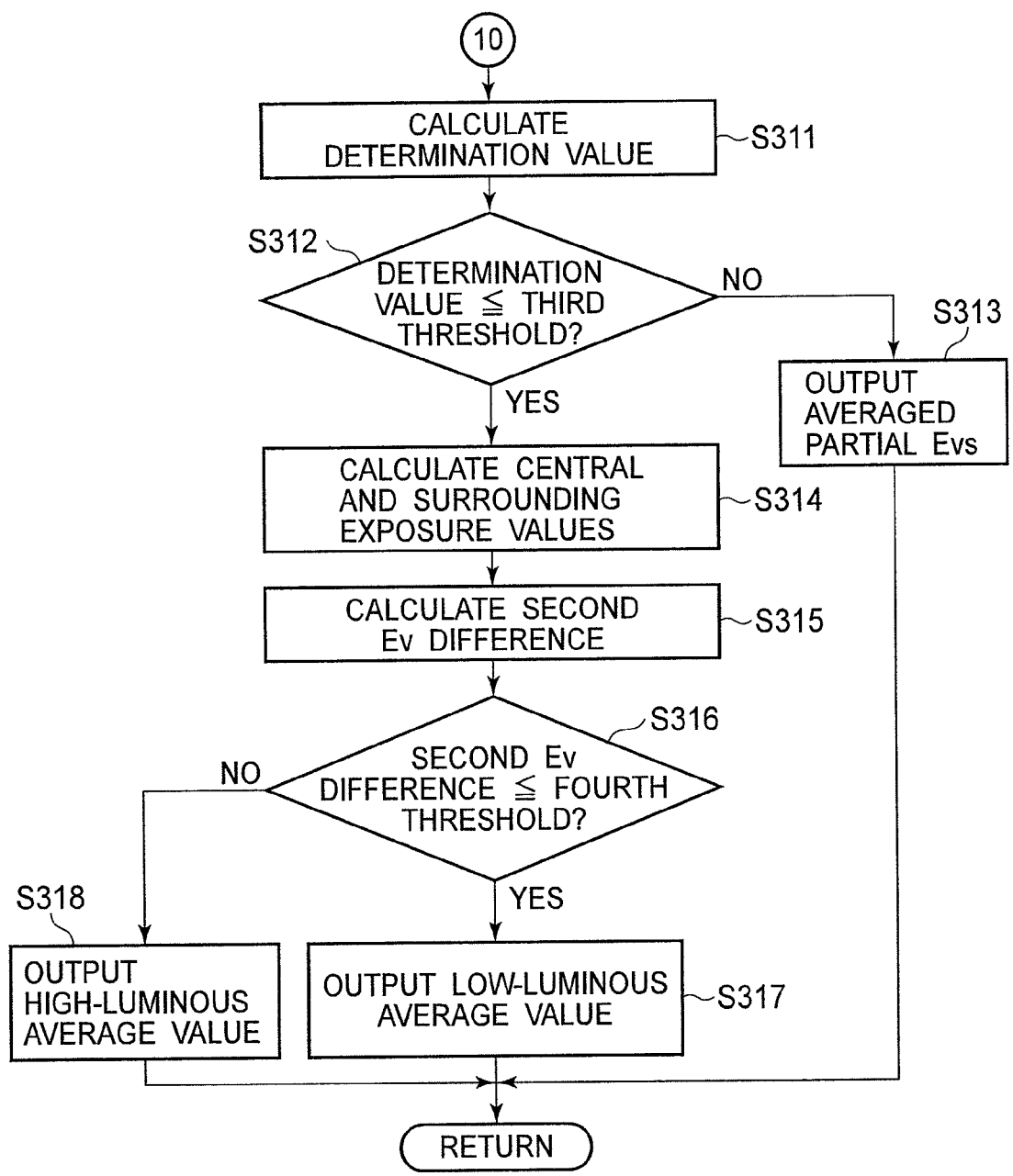
FIG. 11 is a second flowchart illustrating the subroutine of the Ev determination.

Next, a subroutine of the Ev determination process (S300) is explained below using the flowchart of FIGS. 10 and 11.

At step S301, the Ev calculator 30 reads from the SDRAM 32 all of the partial Ev data that the usage data were added to. After reading all partial Ev data that the usage data were added to, the process proceeds to step S302.

At step S302, the Ev calculator 30 calculates the first average value by averaging all of the partial Ev data read in step S301. After calculation of the first average value, the process proceeds to step S303.

At step S303, the Ev calculator 30 categorizes photometric zones 41 corresponding to partial Ev data that the usage data were added to as either high- or low-luminous zones by comparing the partial Evs to the first average value. After categorization of all of the photometric zones 41 corresponding to the partial Ev data that the usage data were added to, the process proceeds to step S304.

At step S304, the Ev calculator 30 calculates the high-luminous average value by averaging the partial Evs corresponding to all the photometric zones 41 categorized into the high-luminous zone. In addition, the Ev calculator 30 calculates the low-luminous average value by averaging the partial Evs corresponding to all the photometric zones 41 categorized into the low-luminous zone. After calculation of the high- and low-luminous average values, the process proceeds to step S305.

At step S305, the Ev calculator 30 calculates the standard value by averaging the high- and low-luminous average values. In addition, the Ev calculator 30 designates the determination range on the basis of the standard value. After designation of the determination range, the process proceeds to step S306.

At step S306, the Ev calculator 30 resets the second determination number to zero. After reset, the process proceeds to step S307.

At step S307, the Ev calculator 30 reads the partial Ev data that the usage data was added to. After reading the partial Ev data, the process proceeds to step S308.

At step S308, the Ev calculator 30 determines whether or not the partial Ev corresponding to the partial Ev data read at step S307 is included in the determination range designated at step S305. When the partial Ev is included in the determination range, the process proceeds to step S309. When the partial Ev is not included in the determination range, the process skips step S309 and proceeds to step S310.

At step S309, the Ev calculator 30 adds +1 to the second determination number. After addition to the second determination number, the process proceeds to step S310.

At step S310, the Ev calculator 30 determines whether or not all of the partial Evs corresponding to the partial Ev data that the usage data were added to have been compared to the determination range. When all of the partial Evs have not been compared to the determination range, the process returns to step S307 and steps S307 to S309 are repeated until all of the partial Evs are compared to the determination range, at which point the process proceeds to step S311.

At step S311, the Ev calculator 30 counts the third determination number, which is the number of partial Ev data that the usage data were added to. In addition, the Ev calculator 30 calculates the determination value by dividing the second determination number by the third determination number. After calculation of the determination value, the process proceeds to step S312.

At step S312, the Ev calculator 30 determines whether or not the determination value is less than or equal to the third threshold. When the determination value is greater than the third threshold, the process proceeds to step S313. When the determination value is less than or equal to the third threshold, the process proceeds to step S314.

At step S313, the Ev calculator 30 reads all of the partial Ev data from the SDRAM 32. In addition, the Ev calculator 30 averages all of the partial Evs corresponding to the read-out partial Ev data. Finally, the Ev calculator 30 outputs the average of the partial Evs as the u-Ev to the exposure controller 19. When the Ev calculator 30 outputs the average of the partial Evs, the subroutine of the Ev determination process terminates.

At step S314, the Ev calculator 30 determines the central exposure value by calculating the average of the partial Evs for all of the photometric zones 41 located inside of the central area 41c. In addition, the Ev calculator 30 determines the surrounding exposure value by calculating the average of the partial Evs for all of the photometric zones 41 located inside of the surrounding area 41a. After calculation of the central and surrounding exposure values, the process proceeds to step S315.

At step S315, the Ev calculator 30 calculates the second Ev difference by subtracting the surrounding exposure value from the central exposure value. After calculation of the second Ev difference, the process proceeds to step S316.

At step S316, the Ev calculator 30 determines whether or not the second Ev difference is less than the fourth threshold. When the second Ev difference is less than the fourth threshold, the process proceeds to step S317. When the second Ev difference is greater than or equal to the fourth threshold, the process proceeds to step S318.

At step S317, the Ev calculator 30 outputs the low-luminous average value calculated in step S304 as the u-Ev to the exposure controller 19. When the Ev calculator 30 outputs the low-luminous average value, the subroutine of the Ev determination process terminates. On the other hand, at step S318, the Ev calculator 30 outputs the high-luminous average value calculated in step S304 as the u-Ev to the exposure controller 19. When the Ev calculator 30 outputs the high-luminous average value, the subroutine of the Ev determination process terminates.

In the above embodiment, the exposure value for a desired subject can be accurately estimated, especially for a scene in which a dark subject and a bright subject are being photographed together under front or rear lighting conditions. Owing to the accurate estimation of the exposure value, the exposure operations of the single-lens reflex camera 10 can be carried out effectively. The mechanism for estimating the exposure value for a desired subject is explained below.

Figure 12:
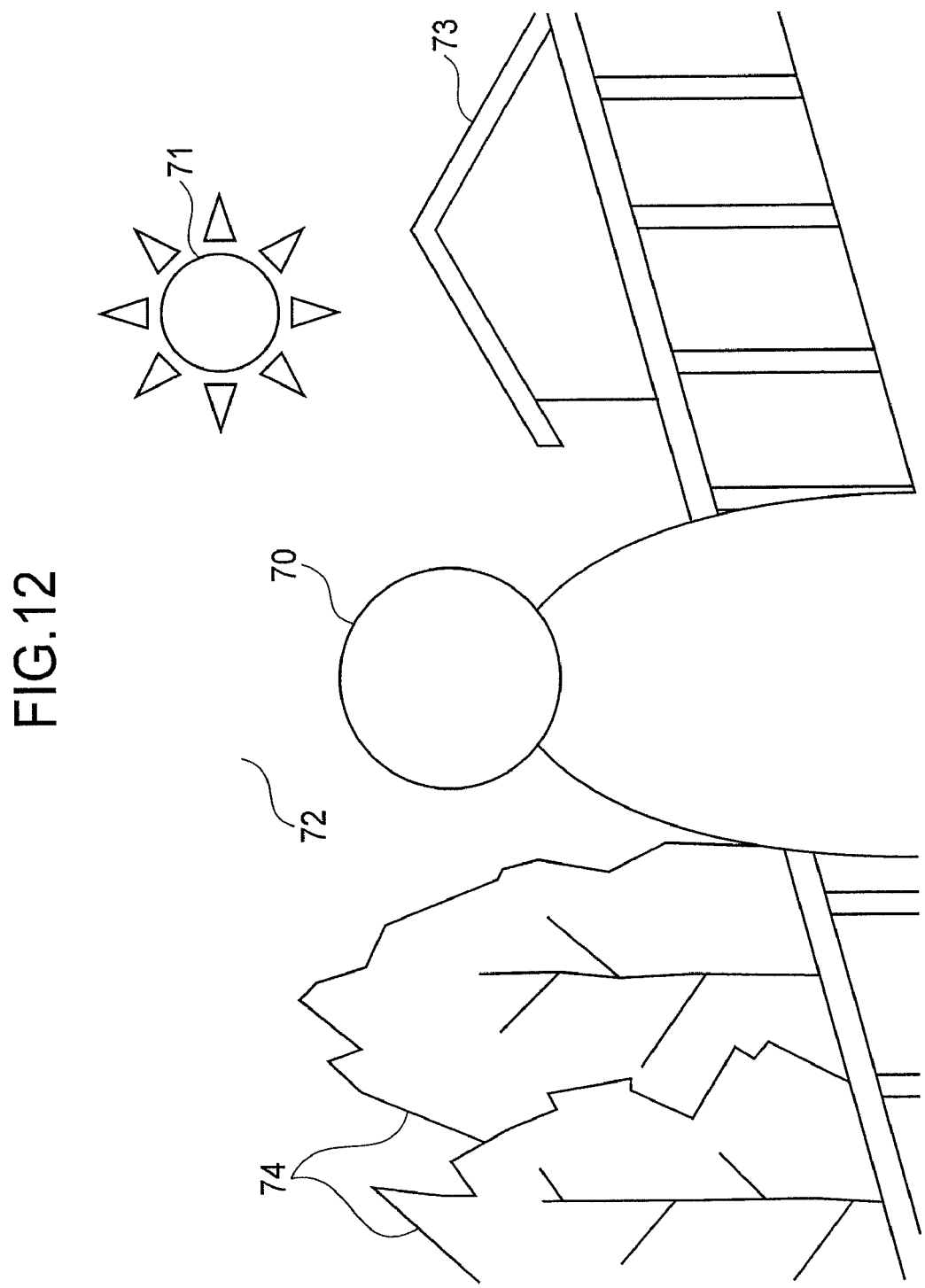
FIG. 12 shows an optical image of a scene of a subject under the rear lighting condition.

The mechanism is explained using the example of a situation where a person is to be photographed outdoors, as shown in FIG. 12. In this particular situation, the area to be photographed includes not only a person 70 but also the sun 71, sky 72, a house 73, trees 74, and various other items. The brightness of the sun 71 and the sky 72 are relatively high, while the brightness of the house 73, trees 74 and person 70 are relatively low.

Figure 13:
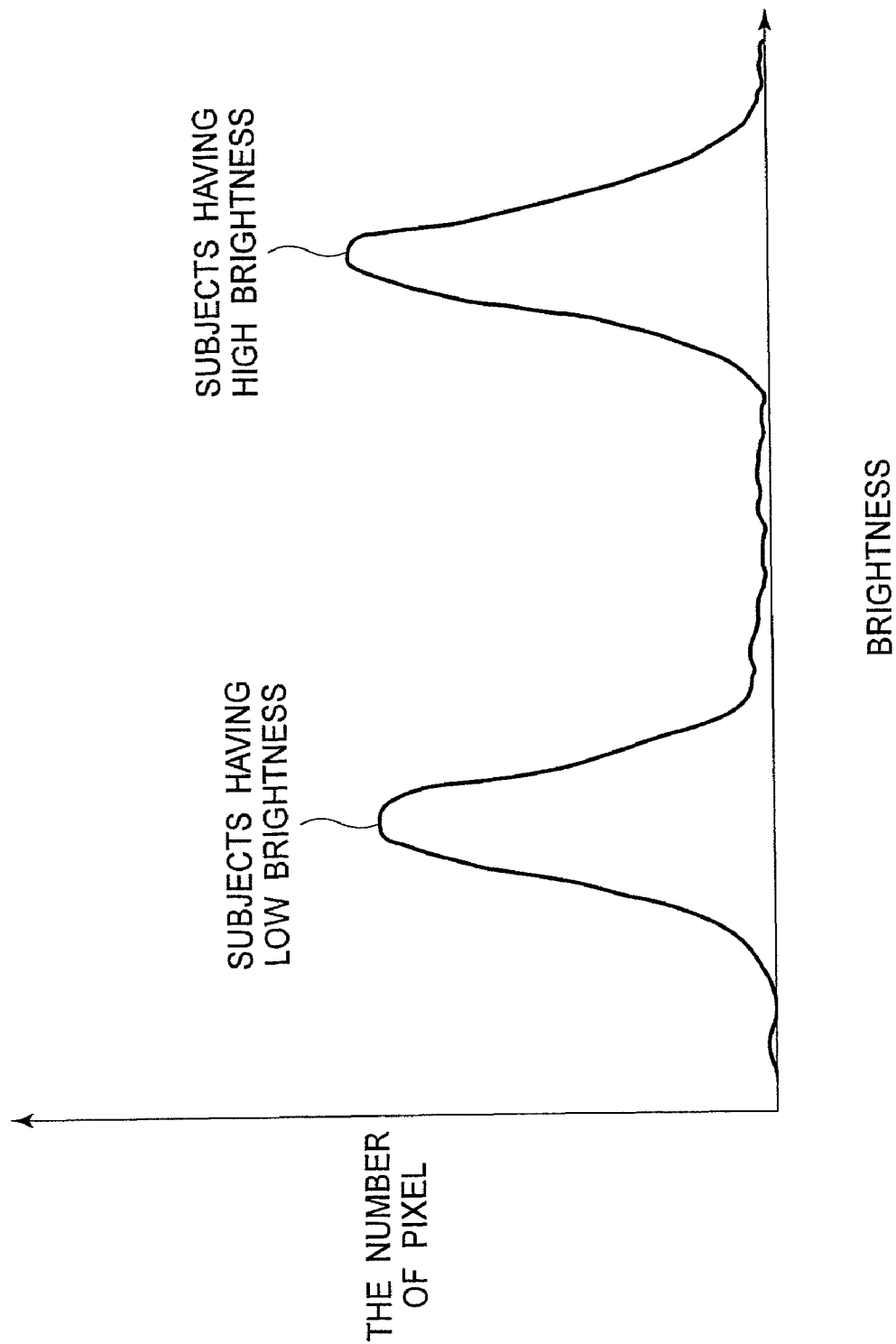
FIG. 13 is a histogram of the number of pixels with respect to brightness.

The distribution of the brightness of the above scene is explained using the histogram of FIG. 13, which indicates the number of pixels (vertical axis) per brightness (horizontal axis). Under the rear lighting condition for the above example, the subjects having low brightness (such as the person 70, the house 73 and the trees 74) and subjects having high brightness (such as the sun and the sky 72) will generally have two separate brightness ranges. Accordingly, the exposure for an image sensor 15 can be appropriately controlled using the brightness of a relatively dark subject.

However, it is difficult for a general photometer 40 to detect the quantity of light from a subject having lower brightness. The size of the photometric zone 41 of the photometer 40 is generally broader than that of the pixel in the image sensor 15. Accordingly, the light received in a single photometric zone 41 will include light from subjects having low and high brightness, making it difficult to receive only light from a subject having low brightness.

Figure 14:
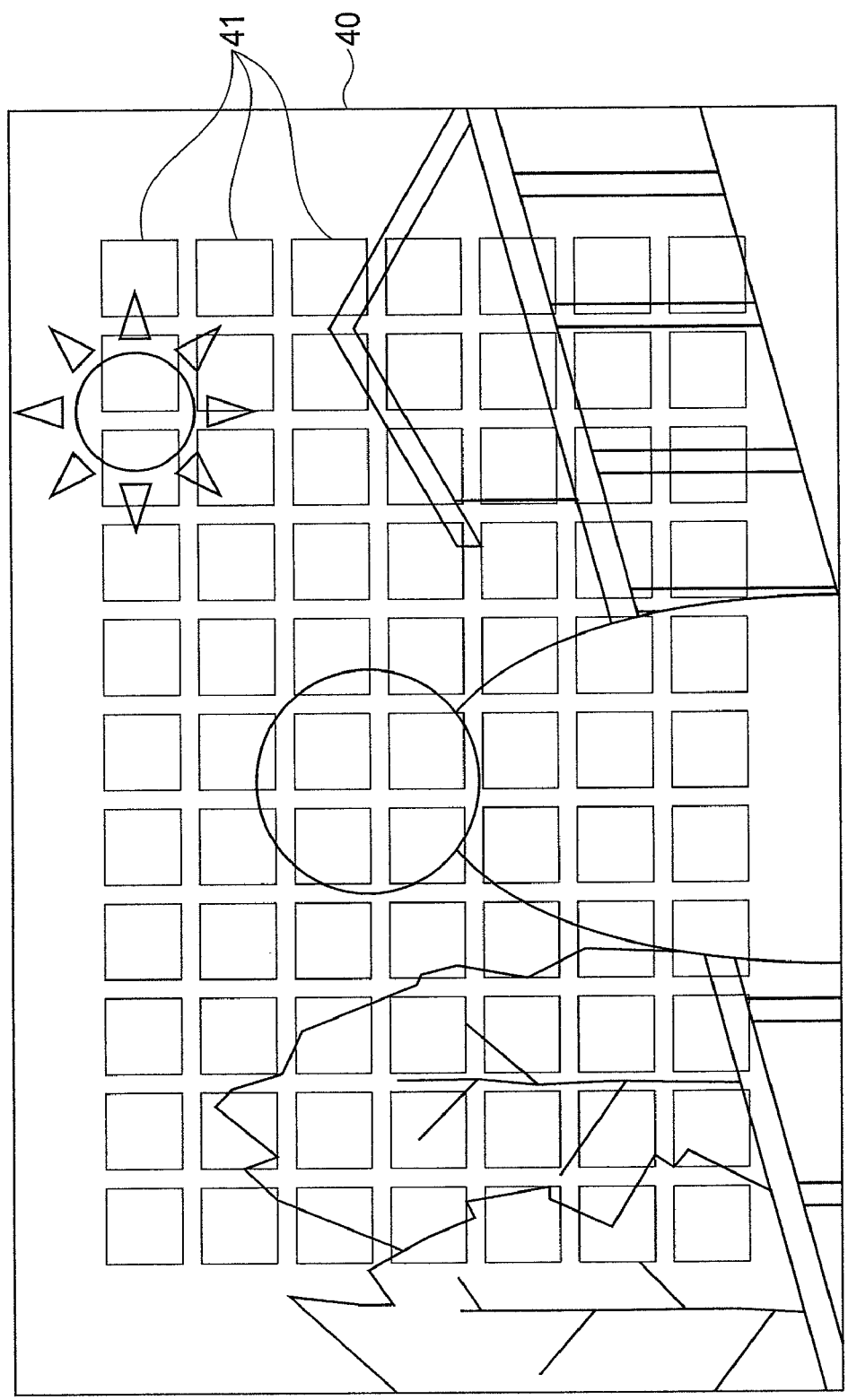
FIG. 14 shows the optical image of FIG. 12 formed on the light-receiving surface of the photometer.

If an optical image is formed on the light-receiving surface of the photometer 40 as shown in FIG. 14, there will be a high quantity of light in the photometric zone 41 where only optical images of subjects having high brightness, such as the sun and sky, are formed. For example, the photometric zone 41 at the intersection of the second row and eighth column receives light only from sky, and the partial Ev for this particular photometric zone 41 is calculated to be 18.3 Ev.

In addition, the quantity of light is low in the photometric zone 41 where only optical images of subjects having low brightness, such as the house, the trees, and the person, are formed. For example, the photometric zone 41 at the intersection of the sixth row and fifth column receives light only from the person, and the partial Ev for this particular photometric zone 41 is calculated to be 7 Ev.

On the other hand, the quantity of light is distributed across a wide range of brightness in the photometric zone 41 where optical images of both high- and low-brightness subjects are formed. For example, the photometric zone 41 at the intersection of the third row and seventh column receives light from the person and the sky, and the partial Ev for this particular photometric zone 41 is calculated to be 10 Ev.

Figure 15:
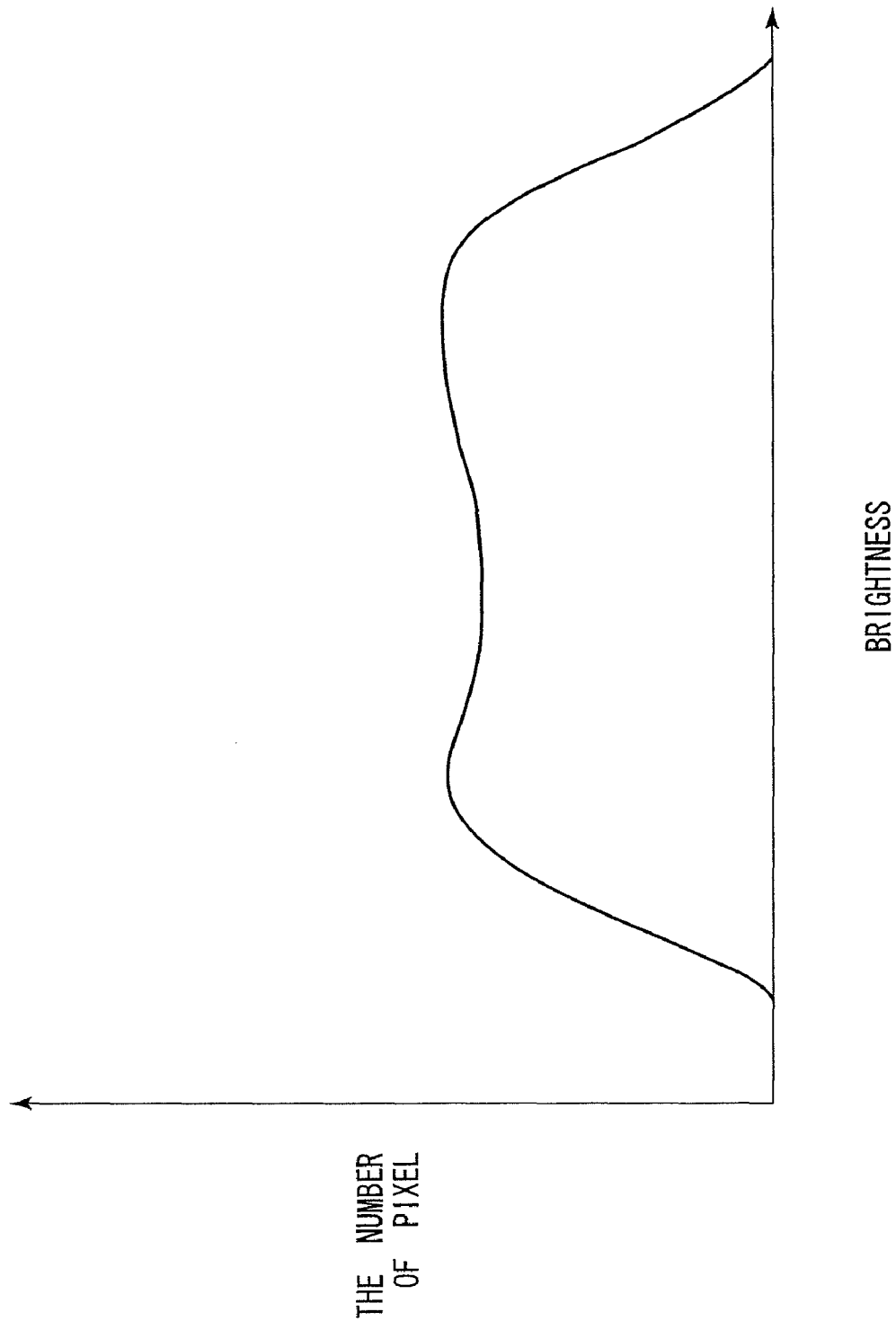
FIG. 15 is the histogram of the number of photometric zones with respect to brightness for the optical image of FIG. 14.

Accordingly, as shown in FIG. 15, the brightness range for subjects having low and high brightness cannot be clearly separated using the quantity of light detected by the photometric zone 41. So, it is difficult to estimate which range of brightness is adequate for a desired subject.

In the above embodiment, whether or not individual photometric zones 41a receive light from subjects having low and high brightness is determined on the basis of the difference between the partial Evs of the target zone 41f and the neighboring zones 41s. Generally, the quantity of light in a photometric zone 41 receiving light from only one subject having either a low or high brightness is close to the quantity of light in surrounding photometric zones 41.

On the other hand, the quantity of light in a photometric zone 41 receiving light from subjects having both low and high brightness is generally very different from the quantities of light in surrounding photometric zones 41. This is because an optical image that is formed on a photometric zone 41 that receives light from subjects having both low and high brightness generally straddles the dividing line that separates the subjects of low and high brightness, while the photometric zones 41 surrounding such a photometric zone 41 receive light from subjects that are on one or the other side of such dividing line and may have either low or high brightness, but generally not both.

Figure 16:
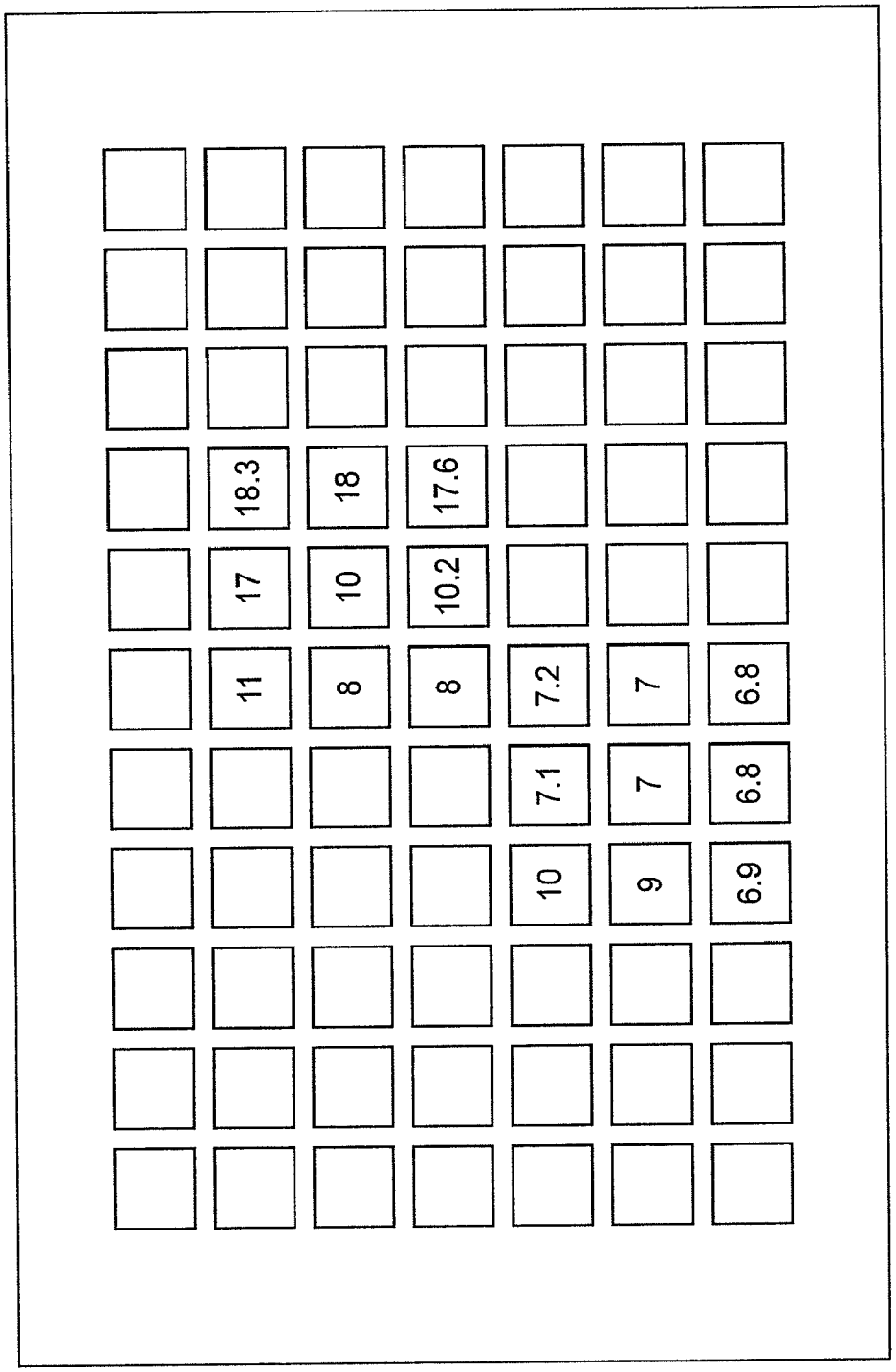
FIG. 16 shows the partial Evs calculated for part of the photometric zones fir the optical image of FIG. 14.

For example, in FIG. 14, the photometric zone 41 at the intersection of the third row and seventh column receives light from the person 70 and the sky 72. As shown in FIG. 16, the partial Ev for this particular photometric zone 41 is substantially different from those of many of the surrounding photometric zones 41. Among the photometric zones 41 surrounding the photometric zone at the intersection of the third row and seventh column, only the photometric zone 41 at the intersection of the fourth row and seventh column has a partial Ev with a difference from the partial Ev of the photometric zone 41 at the third row and seventh column that is less than or equal to the first threshold.

On the other hand, in FIG. 14, the photometric zone 41 at the intersection of the sixth row and fifth column receives light only from the person 70. As shown in FIG. 16, the partial Ev for this particular photometric zone 41 is relatively close to those for many of the photometric zones surrounding it. Among the photometric zones 41 surrounding the photometric zone at the intersection of the sixth row and fifth column, the six photometric zones 41 arranged in the fifth row and fifth column, fifth row and sixth column, sixth row and sixth column, seventh row and fourth column, seventh row and fifth column, and seventh row and sixth column all have partial Evs with relative differences from the partial Ev of the photometric zone 41 arranged in the sixth row and fifth column that are less than or equal to the first threshold.

Accordingly, a photometric zone 41 which receives light from subjects having low and high brightness can be estimated on the basis of the number of the surrounding photometric zones in which a difference in the partial Evs is less than or equal to the first threshold. And by excluding the photometric zone 41 that receives light from a combination of subjects having both low and high brightness, the brightness ranges for subjects having low and high brightness can be detected. Consequently, the exposure can be appropriately controlled.

In addition, in the above embodiment, the exposure can be further appropriately controlled under conditions that exclude both front and rear lighting, as explained below. Under conditions that exclude front and rear lighting, in general no photometric zones 41 should be excluded. Accordingly, under this condition all photometric zones 41 are used for the calculation of the u-Ev, which is directly used for controlling the aperture ratio and the shutter speed when a desired subject is determined to be under conditions that exclude front and rear lighting.

The determination of whether or not a desired subject is under conditions excluding front and rear lighting is explained below. Even though the photometric zone 41 does not receive mixed light from subjects having low and high brightness, the quantity of light received in photometric zone 41 happens to be close to that for mixed light of subjects having low and high brightness. A photometric zone 41 that does not receive mixed light, and whose quantity of light is close to that of mixed light, is hereinafter referred to as a middle-quantity zone. In addition, a photometric zone 41 that receives mixed light from a combination of subjects having both low and high brightness is referred to as a mixed zone. There are fewer relatively large differences in partial Ev that exist between the middle-quantity zone and its neighboring photometric zones than compared to the relationships between the mixed zone and its neighboring zones.

In the above embodiment, a target zone 41$f$ that has a relatively large number of neighboring zones 41$s$ whose partial Evs are substantially different from the partial Ev of the target zone 41$f$ is determined to be the mixed zone. In addition, the middle-quantity zones are selected by excluding the photometric zones that are determined to be mixed zones. The number of middle-quantity zones is the value assigned to the second determination number. And when the ratio of the second determination number to the third determination number is small, a desired subject is determined to be under either front or rear lighting conditions because many photometric zones 41 receive mixed light from a combination of subjects having low and high brightness. On the other hand, when the ratio of the second determination number to the third determination number is large, a desired subject is determined to be under neither front nor rear lighting conditions.

In addition, in the above embodiment the exposure can be appropriately controlled under either front or rear lighting conditions, as explained below. The single-lens reflex camera 10 is usually positioned so that a desired subject is near the center of the area to be photographed. Accordingly, in the above embodiment when the partial Ev at the central area 41$c$ is substantially lower than that of the surrounding area 41$a$, a subject is under rear lighting conditions. On the other hand, when the partial Ev at the central area 41$c$ is not substantially lower than that of the surrounding area 41$a$, a subject is under front lighting conditions.

The partial Ev is calculated according to the quantity of light received at the photometric zone 41, and the exposure is appropriately controlled on the basis of the calculated partial Evs in the above embodiment. However, the exposure can be controlled directly on the basis of either the quantity of light received at the photometric zone 41 or a variable that varies according to the quantity of light.

Whether a subject is under front or rear lighting conditions, or a condition other than front or rear lighting conditions is determined in the above embodiment. However, even if this determination is not made the exposure value for a desired subject can still be accurately estimated under front or rear lighting conditions.

Whether a subject is under front or rear lighting conditions is determined using a brief process in the above embodiment. However this need not be the case as the single-lens reflex camera 10 may be equipped with at least one of front and rear lighting modes, for example, from which low- and high-luminous average values can be used for the u-Ev to control the exposure.

The eight photometric zones 41 adjacent to the target zone 41$f$ are designated as the neighboring zones 41$s$ in the above embodiment, but the photometric zones 41 designated as the neighboring zones 41$s$ are not limited to the eight adjacent photometric zones 41. As long as a plurality of photometric zones 41 around the target zone 41$f$ is designated as the neighboring zones 41$s$, the same effect as the above embodiment can be achieved.

The photometric zones 41 neighboring the target zone 41$f$ are designated as the neighboring zones 41$s$ in the above embodiment. However, the photometric zones 41 designated as the neighboring zones 41$s$ are not limited to those neighboring the target zone 41$f$. As long as a photometric zone located at a predetermined position near the target zone 41$f$ is designated as the neighboring zone 41$s$, the same effect as the above embodiment can be achieved.

All the photometric zones 41 excluding the top and bottom rows and the leftmost and rightmost columns are designated one by one as the target zone 41$f$, in the above embodiment. However, a photometric zone 41 in any area can be designated as the target zone 41$f$. In addition, even if each one of the photometric zones 41 is not designated as the target zone 41$f$, the same effect as the above embodiment can be achieved.

The first average value is used for categorizing the photometric zone 41 into either high- or low-luminous zones in the above embodiment. However, another value adequate for categorizing the photometric zone 41 into high- or low-luminous zones can be calculated and used for the categorization. For example, instead of using a categorization value that is based on the first average, the same effect as the above embodiment can be achieved if the categorization value is determined by either the average of the two partial Evs that correspond to the local maximum and minimum number of photometric zones, a partial Ev that corresponds to the photometric zone 41 with the average quantity of light that occurs the lowest number of times (lowest frequency), or a partial Ev that represents the midpoint between the absolute maximum and minimum EVs.

When a subject is estimated to be under the front lighting condition, only the high-luminous average value is used for the u-Ev in the above embodiment. However, the u-Ev may be calculated so that a factor of the high-luminous average value has a greater impact on the calculated u-Ev. For example, the u-Ev can be calculated by averaging the high- and low-luminous average values with unevenly weighted coefficients so that the coefficient of the high-luminous value is greater than the coefficient of the low-luminous value.

When a subject is estimated to be under the rear lighting condition, only the low-luminous average value is used for the u-Ev, in the above embodiment. However, the u-Ev may be calculated so that a factor of the low-luminous average value is has a greater impact on the calculated u-Ev. For example, the u-Ev can be calculated by averaging the high- and low-luminous average values with unevenly weighted coefficients so that the coefficient of the low-luminous value is greater than that of the high-luminous value.

The photometric zone 41 used in the calculation of u-Ev is selected when the multi-zone metric is selected in the above embodiment. However, the selection of the photometric zone 41 is not limited to a specified method, such as the multi-zone metric. As long as a plurality of photometric zones 41 are used for the calculation of u-Ev, the photometric zone 41 can be selected in the center-weighted metering or the spot metering.

The quantity of light for the control of the exposure of the single-lens reflex camera 10 is detected by the photometer 40, in the above embodiment. However, the image sensor 15 can be used instead of the photometer 40. By mixing quantities of light incident on a plurality of pixels that neighbor one another, the quantity of light incident on the photometric zone 41 can be calculated.

The exposure control unit is adopted for a digital single-lens reflex camera 10 in the above embodiment. However, the exposure control unit can be adopted for a compact digital camera and a light meter in photography.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2009-149010 (filed on Jun. 23, 2009), which is expressly incorporated herein, by reference, in its entirety.

The invention claimed is:

1. An exposure control unit that controls the exposure of an imaging apparatus, the exposure control unit comprising:
   a photometer that comprises a plurality of photometric zones on a light-receiving surface, an optical image of an object to be imaged by the imaging apparatus being made incident on the light-receiving surface of the photometer, each of the photometric zones detecting a partial quantity of the light incident on each photometric zone;
   a designator that designates a plurality of the photometric zones one by one as a target zone, the designator designating a plurality of the photometric zones arranged in predetermined positions with respect to the target zone as neighboring zones;
   a first calculator that calculates a first difference between light values, the first difference of light values being a difference between a partial value of light in the target zone and the partial value of light in the neighboring zones, the partial value of light varying according to the partial quantity of light;
   a first counter that counts a first determination number for each target zone, the first determination number being the number of neighboring zones with the first difference of light values that is less than a first threshold for the temporarily designated target zone;
   a selector that selects the target zone of which the first determination number is greater than a second threshold;
   a second calculator that calculates a categorization value on the basis of the partial value of light of the target zone selected by the selector, the categorization value being used for categorization of the target zone;
   a categorizer that categorizes a target zone having a partial value of light that is less than the categorization value into a low-luminous zone among the target zones selected by the selector, and that categorizes a target zone having the partial value of light that is greater than the categorization value into the high-luminous zone among the target zones selected by the selector; and
   an exposure controller that controls an exposure of the imaging apparatus on the basis of the partial value of light of at least one of the low-luminous zone and the high-luminous zone,
   wherein the second calculator calculates a categorization value of a whole of the light-receiving surface on the basis of the amount of light in one or more of the targets that are selected by the selector.

2. An exposure control unit according to claim 1, further comprising:
   a third calculator that calculates second and third average values, the second average value being an average of the partial value of light for the low-luminous zones, the third average value being an average of the partial value of light for the high-luminous zones;
   a fourth calculator that calculates a fourth average value, the fourth average value is an average of the second and third average values;
   a second counter that counts a second determination number, the second determination number being the number of the target zones of which the partial value of light is included in a range predetermined from the fourth average value among the target zones selected by the selector, and
   a third counter that counts a third determination number, the third determination number being the number of target zones selected by the selector,
   the exposure controller controlling the exposure of the imaging apparatus on the basis of the partial values of light for at least one of the low-luminous zone and the high-luminous zone when the ratio of the second determination number to the third determination number is less than a third threshold.

3. An exposure control unit according to claim 2,
   wherein the exposure controller controls the exposure of the imaging apparatus on the basis of the partial values of light for all photometric zones of the photometer when the ratio of the second determination number to the third determination number is greater than the third threshold.

4. An exposure control unit according to claim 1, further comprising:
   a fifth calculator that calculates a second difference of light value,
   the second different of light value being a difference between the partial values of light for the photometric zones included in a predetermined first area of the light receiving surface and the photometric zones outside of the first area, and
   the exposure controller controlling the exposure of the imaging apparatus on the basis of the partial value of light for the high-luminous zone when the second difference of light value is less than a fourth threshold,
   the exposure controller controlling the exposure of the imaging apparatus on the basis of the partial value of light for the low-luminous zone when the second difference of light value is greater than the fourth threshold.

5. An exposure control unit according to claim 1,
   wherein the categorization value is an average of the partial values of light of the target zones selected by the selector.

6. An exposure control unit according to claim 1,
   wherein the photometer is an image sensor photographing an optical image that is brought into focus by a photographic optical system of the imaging apparatus.

7. An imaging apparatus, comprising:
   a photometer that comprises a plurality of photometric zones on a light-receiving surface, an optical image of an object to be imaged being incident on the light-receiving surface of the photometer, each of the photometric zones detecting a partial quantity of light incident on each photometric zone;
   a designator that designates a plurality of the photometric zones one by one as a target zone, the designator designating a plurality of the photometric zones arranged in predetermined positions with respect to the target zone as neighboring zones;
   a first calculator that calculates a first difference between light values, the first difference between light values being a difference between a partial value of light in the target zone and the partial value of light in the neighboring zones, the partial value of light varying according to the partial quantity of light;

a selector that selects the target zone of which a first determination number is greater than a second threshold, the first determination number being the number of the neighboring zones with the first difference of light values that is less than a first threshold for the tentatively designated target zone;

a second calculator that calculates a categorization value on the basis of the partial value of light of the target zone selected by the selector, the categorization value being used for categorization of the target zone;

a categorizer that categorizes a target zone having a partial value of light that is less than the categorization value into a low-luminous zone among the target zones selected by the selector, and that categorizes a target zone having the partial value of light that is greater than the categorization value into the high-luminous zone among the target zones selected by the selector; and an exposure controller that controls an exposure of the imaging apparatus on the basis of the partial value of light of at least one of the low-luminous zone and the high-luminous zone, wherein the second calculator calculates a categorization value of a whole of the light-receiving surface on the basis of the amount of light in one or more of the targets that are selected by the selector.

* * * * *